United States Patent
Seong

Patent Number: 5,701,288
Date of Patent: Dec. 23, 1997

[54] OPTICAL PICKUP DEVICE WITH LIGHT SPOT SIZE ADJUSTMENT FOR DIFFERENT DENSITY DISKS

[75] Inventor: Pyong-yong Seong, Seoul, Rep. of Korea

[73] Assignee: Samsung Electronics Co., Ltd., Suwon, Rep. of Korea

[21] Appl. No.: 564,430

[22] Filed: Nov. 29, 1995

[30] Foreign Application Priority Data

Nov. 29, 1994 [KR] Rep. of Korea ............... 1994-31843

[51] Int. Cl.⁶ .................................................. G11B 7/00
[52] U.S. Cl. ........................ 369/112; 369/94; 369/124; 369/44.26
[58] Field of Search .................... 369/54, 58, 124, 369/112, 48, 44.31, 44.29, 44.26, 94; 386/105, 126

[56] References Cited

U.S. PATENT DOCUMENTS

| | | | |
|---|---|---|---|
| 4,797,869 | 1/1989 | Hirano | 369/75.2 |
| 5,202,874 | 4/1993 | Zucker et al. | 369/54 |
| 5,281,797 | 1/1994 | Tatsuno et al. | 369/117 |
| 5,289,451 | 2/1994 | Ashinuma et al. | 369/58 |
| 5,309,249 | 5/1994 | Ishii | 386/105 |
| 5,499,231 | 3/1996 | Fennema et al. | 369/94 |
| 5,526,338 | 6/1996 | Hasman et al. | 369/94 |
| 5,541,900 | 7/1996 | Ito et al. | 369/54 |
| 5,541,905 | 7/1996 | Aramaki | 369/58 |
| 5,615,186 | 3/1997 | Rosen et al. | 369/94 |

*Primary Examiner*—David C. Nelms
*Assistant Examiner*—Kim-Kwok Chu
*Attorney, Agent, or Firm*—Burns, Doane, Swecker & Mathis, L.L.P.

[57] ABSTRACT

An object pickup device includes a light source, an object lens for concentrating light generated from the light source onto an optical disk, a photodetector for detecting a signal from the light reflected from the optical disk, a disk detecting portion for detecting the light quantity in a light spot concentrated on the optical disk by the object lens and for detecting the optical disk type, a focus offset calculating portion for calculating a focus offset corresponding to the detected disk type, a focus servo portion for performing a focus servo mechanism according to the signal calculated from the focus offset and the signals detected in the photodetector, and a light output optimizing means for optimizing the light output of the light source according to the calculated focus offset signal. Meanwhile, a controlling method of a light output in the optical pickup device includes a disk kind detecting step, a focus offset calculating step, a focus offset adjusting step, and a compensating a focus and track error step.

9 Claims, 4 Drawing Sheets

OPTICAL PICKUP DEVICE WITH LIGHT SPOT SIZE ADJUSTMENT FOR DIFFERENT DENSITY DISKS

BACKGROUND OF THE INVENTION

The present invention relates to an optical pickup device which can optimize the size of an optical spot radiated upon the recording surface of an optical recording medium and a method of controlling the light output thereof. More particularly, the present invention relates to an optical pickup device which can optimize the size of a spot of light which is radiated from a short-wavelength light source used for high-density recording and focused upon the recording surface of the optical recording medium, and to a method of controlling the light output thereof.

Generally, an optical pickup device employs a semiconductor laser which outputs long wavelength light of 780 nm or 830 nm. In this case, there is a limitation in reducing the size of the optical spot formed on the optical recording medium, which is an obstacle to high-density recording.

To reduce the optical spot size, a light source with a shorter wavelength from 400 nm to 500 nm is used. Research in an optical pickup device with a light source which can output such a short wavelength light, is being actively pursued, particularly to an optical pickup device that employs not only a semiconductor laser having a visible-ray wavelength of 600 nm, but a solid laser such as Nd:YAG or Nd:YVO$_4$ which outputs a short wavelength ray of about 530 nm through second resonance.

For reference, in a compact disc player, data containing the wavelength of light and the spot diameter of the light in accordance with numerical aperture are presented.

When the wavelength of a ray emitted from a light source of an optical pickup device is 780 nm and a numerical aperture (NA) is 0.45, the spot diameter is 1.47 µm, and when the wavelength of a ray emitted from the light source is 532 nm and the NA is 0.6, the spot diameter is 0.75 µm. Thus, the spot area ratio of the above two conditions is about 3.8:1.

As shown from the above data, the diameter of the optical spot decreases as the wavelength of the light source is reduced, and the diameter of the optical spot increases as the NA of an object lens is increased. The diameter of the optical spot affects the recording density of an optical disk, and serves as a major factor in determining the optical spot diameter of the wavelength of the light from the aforementioned light source.

FIG. 1 is a schematic view showing a conventional short wavelength optical disk head having a variable aperture disclosed in U.S. Pat. No. 5,281,797. Referring to the drawing, the functions and problems of the conventional optical disk head are surveyed as follows.

This optical disk head includes short wavelength light source 1 for generating an incident light 2 of about 530 nm in order to substantially reduce the optical spot size focused upon an optical disk 7.

The incident light then passes in the following order through a polarized beam splitter 3, a diffraction grating 9 for diffracting the light in order to correct tracking error signals, a collimating lens 4 for providing a collimated light beam, and an aperture 5 for optimizing the diameter of the beam according to the recording density of optical disk 7 disposed prior to object lens 6. Light reflected from optical disk 7 passes back through the optical members to beam splitter 3, and is reflected therefrom in a direction perpendicular to the incident light axis to move toward an astigmatism lens 10 for correcting focus error signals. The light passing through astigmatism lens 10 reaches a photodetector 8 for detecting the recorded information and any error signals.

In addition, a light amount measuring device 12 for detecting the collected quantity of light and a driver 11 for controlling the quantity of light collected from the light source according to information from measuring device 12, are provided as means for controlling the quantity of light radiated upon optical disk 7.

The conventional optical pickup device of the above construction can optimize the size of the focused optical spot according to the recording density of disk 7, and compensate for the loss in the quantity of light due to aperture 5 through measuring device 12 so that a relatively constant light quantity is provided.

However, to optimize the optical spot size, aperture 5 is employed, and a driving device for driving the aperture is required. Due to the optical loss in the quantity of light incident on disk 7 caused by the aperture, it is necessary to increase the output of the light source 1.

SUMMARY OF THE INVENTION

To solve the above problems, it is an object of the present invention to provide an optical pickup device in which the utilization efficiency of the quantity of light radiated from a light source is improved and in which both optical disks for long and short wavelengths can be used.

It is another object of the present invention to provide a controlling method of the light output of the optical pickup device, by which the utilization efficiency of the quantity of light radiated from a light source is improved and in which both optical disks for long and short wavelengths can be used.

Accordingly, to achieve the first object, there is provided an optical pickup device comprising: a light source; an object lens for concentrating the light generated from the light source onto an optical disk; a photodetector for detecting signals from the light reflected from the optical disk; an optical disk detecting portion for detecting the kind of the optical disk from the signals detected by the photodetector; a focus offset calculating portion for calculating a focus offset corresponding to the detected disk kind; a focus offset adjusting portion for adjusting the focus offset amount calculated from the focus offset calculating portion and converting the adjusted focus offset amount to a focus servo signal; and a focus/track servo portion for compensating for focus and track errors by utilizing the signals adjusted at the focus offset calculating portion and the signals detected from the photodetector.

To achieve the second object, there is provided a controlling method of the light output of the optical pickup device including a light source, an object lens for concentrating the light generated from the light source onto an optical disk, a photodetector for detecting signals from the light reflected from the optical disk, the controlling method comprising the steps of: detecting the kind of the optical disk from the signals detected by the photodetector; calculating an optimum spot size for setting an optical spot size corresponding to the detected disk kind; calculating a focus offset corresponding to the detected disk kind; adjusting the focus offset amount calculated from the focus offset calculating portion and converting the adjusted focus offset amount to a focus servo signal; and compensating for focus and track errors by utilizing the signals adjusted at the focus offset calculating portion and the signals detected from the photodetector.

BRIEF DESCRIPTION OF THE DRAWINGS

The above object and advantage of the present invention will become more apparent by describing in detail a preferred embodiment thereof with reference to the attached drawings in which.

DETAILED DESCRIPTION OF THE INVENTION

Figure 2:
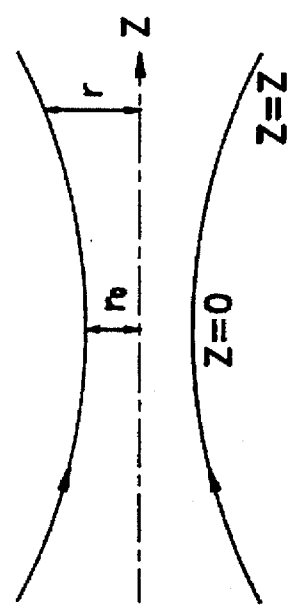
FIG. 2 is a schematic showing the travelling property of a light beam.

As shown in FIG. 2, light emitted from a light source does not form a focal point exactly on a single point when the light is converged by an object lens, but has a beam waist of a minimum radius $r_O$ which satisfies a formula, $r_O = k\lambda/NA$. Here, k is a proportional constant, $\lambda$ is the wavelength of the light emitted from the light source, and NA is the numerical aperture of the object lens.

Also, when the radiated light is in Gaussian form, the radius r of an optical spot satisfies the following formula for a point deviated as far as Z from the focal plane.

$$r = r_o \left[ 1 + \left( \frac{\gamma Z}{\pi r_o^2} \right)^2 \right]^{1/2} \quad (1)$$

Figure 1:
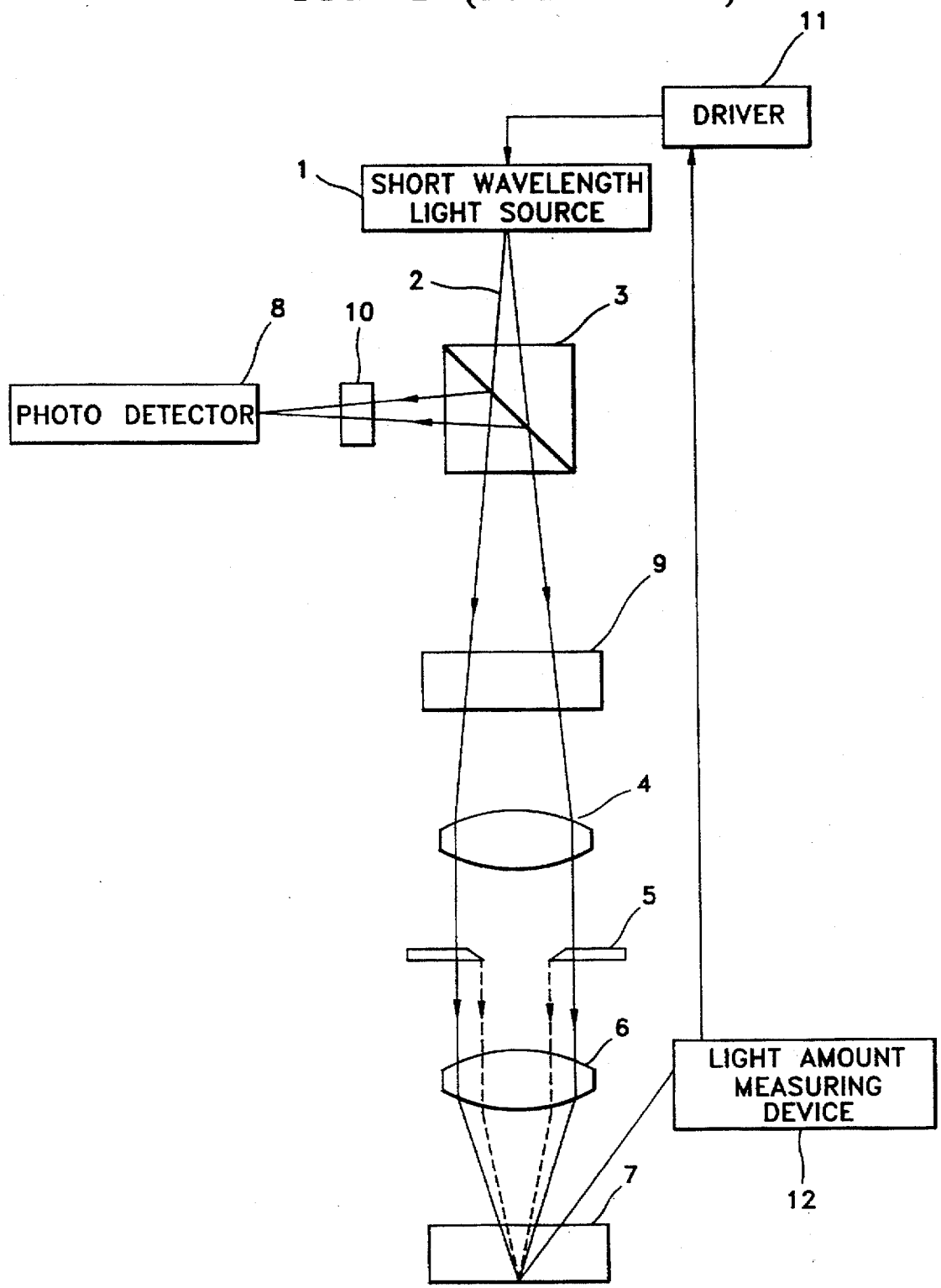
FIG. 1 is a schematic illustrating a conventional short wavelength optical disk head having a variable aperture.
Figure 3:
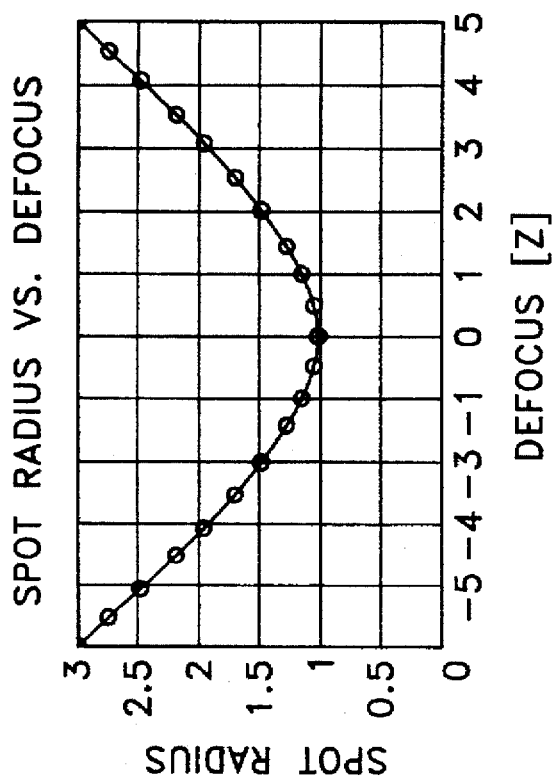
FIG. 3 is a graph showing the spot radius relative to the defocus.

FIG. 3 is a graph showing the spot radius relative to distance Z according to the aforesaid formula. As can be seen, when $Z=\pm\lambda$, the spot radius is 0.38 μm and when $Z=\pm 2\lambda$, the spot radius is approximately doubled to 0.7 μm.

By using the correlation of the optical spot radius with the distance Z in the aforesaid beam waist, the spot size which is formed on an optical disk from light of a short wavelength light source is variably optimized so as to be used in both a high density optical disk and a generally used optical disk.

Figure 4:
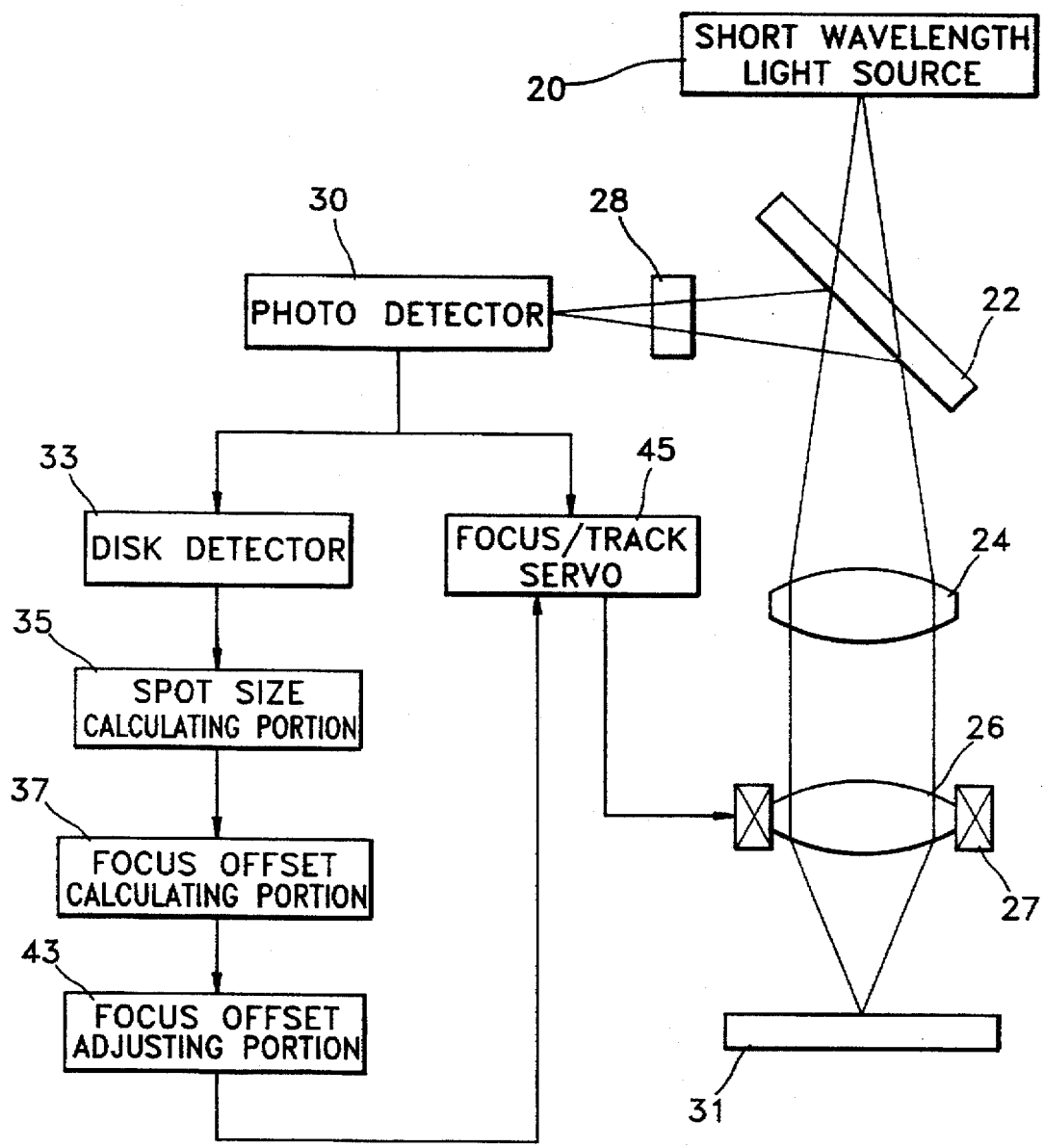
FIG. 4 is a schematic illustrating an optical pickup device according to the present invention.

In FIG. 4, a schematic arrangement of the optical pickup device of the present invention is shown, which utilizes the property that spot size increases when the spot size deviates from the minimum at the beam waist.

The optical pickup device includes a short wavelength light source 20 for generating short wavelength light, an object lens 26 for concentrating the light generated from light source 20 onto an optical disk 31 which is an optical recording medium, and a photodetector 30 for detecting a signal from the light reflected from optical disk 31. The light source 20 radiates short wavelength light to record, reproduce or eliminate information stored in the high-density optical disk.

On the light path between light source 20 and object lens 26, there are provided a collimating lens 24 for converting the spreading light radiated from the light source to parallel light, and light path changing means for changing the light path of the light reflected from optical disk 31 so that the reflected light is directed toward photo detector 30. In the drawing, the light path changing means is shown as beam splitter 22; however, any means which can change light path, such as a hologram device, can be adopted.

To obtain a focus error signal of the light focused onto optical disk 31 and a track error signal generated when object lens 26 follows a track on optical disk 31, there is provided an optical system 28 for a servo mechanism, such as a grating or an astigmatism lens, in the light path between photodetector 30 and object lens 26. The focus error signal and track error signal detected in the photodetector are transmitted to a focus/track servo 45 so as to optimize the distance between object lens 26 and optical disk 31 and compensate for deviation of object lens 26 from the track. The signal transmitted to focus/track servo 45 is then transmitted to an actuator 27 for driving object lens 26.

To optimize the size of the optical spot, which is focused from short wavelength light source 20 onto optical disk 31, by using the light property shown in FIG. 2 so as to be suitable for both a high-density optical disk and a low-density optical disk, another focus servo signal should be transmitted to focus/track servo 45.

For the transmission of another focus signal, there are provided an optical disk detecting portion 33 for detecting the recording density of the optical disk, a spot size calculating portion 35 for calculating the optical spot size corresponding to the recording density from the signal detected in disk detecting portion 33, a focus offset calculating portion 37 for calculating the distance between object lens 26 and disk 31 corresponding to the spot size, and a focus offset adjusting portion 43 for adjusting the focus offset by receiving the signal obtained from focus offset calculating portion 37 and transmitting the adjusted focus offset to focus/track servo 45.

Also, disk detecting portion 33 determines kinds of optical disks according to the data format of the optical disk when focus servo is applied after the optical disk is loaded. That is, in the case of the high-density optical disk and the common optical disk, degrees of modulation (the ratio of a short period signal size to a long period signal size) are about 0.2–0.5 and close to 1, respectively, which can be used to determined the kinds of the optical disks.

Spot size calculating portion 35 stores an optimum spot size according to each optical disk. For example, the optimum spot size diameter is determined as 1.3–1.5 μm for the common optical disk and 0.75–0.9 μm for the high-density optical disk. Thus, the optimum spot size according to the kinds of the optical disks which is determined at optical disk detecting portion 33, can be calculated.

Figure 5:
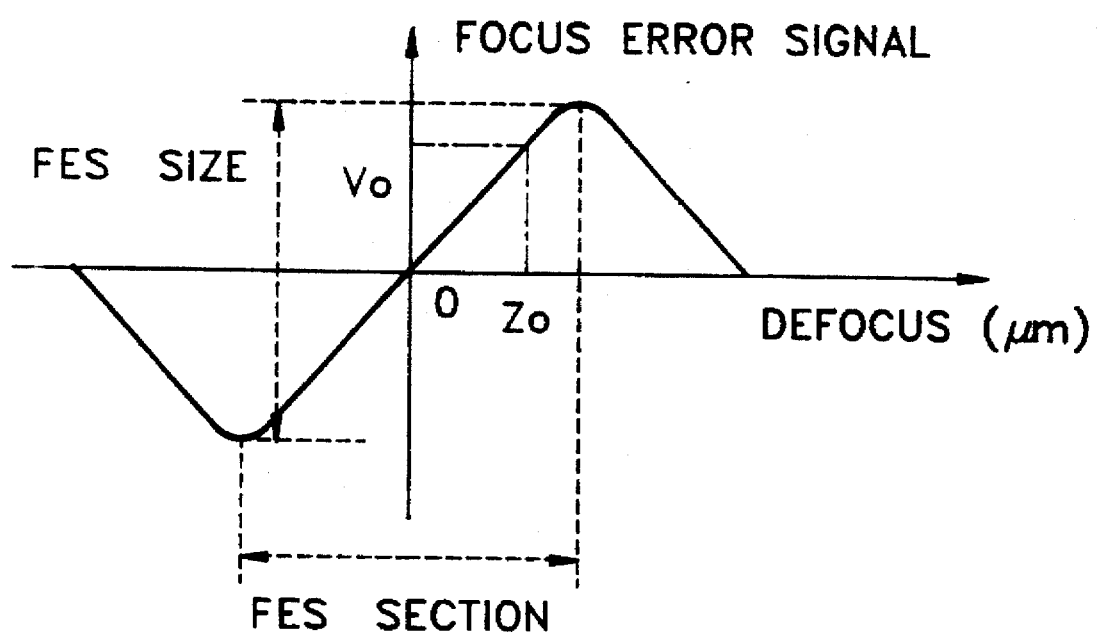
FIG. 5 is a graph showing a focus error signal relative to the defocus.

Focus offset calculating portion 37 calculates defocus amount $Z_O$ from the optimum spot size calculated from spot size calculating portion 35 by using the above formula (1). As shown in FIG. 5, focus offset amount $V_O$ is calculated by using relation between the defocus amount and the focus error signal (FES).

Focus offset adjusting portion 43 adjusts focus offset amount $V_O$ calculated from focus offset calculating portion 37 and converts the adjusted focus offset amount to the focus servo signal suitable for focus/track servo 45.

Focus/track servo 45 receives the focus/track error signals detected by photodetector 30 and the focus servo signal from focus offset adjusting portion 43 and drives actuator 27 for adjusting the position of object lens 26 in order to form the optimum optical spot on the recording surface of the disk according to the kinds of the disks.

As described above, the optical pickup device of the above-mentioned construction using a short wavelength light source, can obtain signals for controlling the optical spot size according to the optical disk type. Therefore, the optical pickup device has compatibility for use not only with a disk utilizing the short wavelength light source but a conventional disk using a long wavelength light source.

Also, the construction of the optical pickup device can be simplified because an aperture employed in the conventional optical pickup device for short wavelength is removed. Hence, the efficiency of light utilization can be improved by transmitting all of the light quantity radiated from the light source to the disk.

Referring to FIG. 4, a controlling method of the light output of the optical pickup device according to the present invention will be described in detail.

The optical pickup device comprises a short wavelength light source 20, an object lens 26 for concentrating the light generated from light source 20 onto an optical disk 31, and a photodetector 30 for detecting a signal from the light reflected from optical disk 31. Here, the controlling method by which the light output of the light source is controlled according to signals detected from photodetector 30 comprises the steps of: detecting the kind of the optical disk from the signals detected by the photodetector; calculating an optimum spot size for setting an optical spot size corresponding to the detected disk kind; calculating a focus offset corresponding to the detected disk kind; adjusting the focus offset amount calculated from the focus offset calculating portion and converting the adjusted focus offset amount to a focus servo signal; and compensating for focus and track errors by utilizing the signals adjusted at the focus offset calculating portion and the signals detected from the photodetector.

In the step of detecting kinds of the optical disks, determination of the disk kinds is possible by the data format of the optical disk when focus servo is applied after the optical disk is loaded. That is, in the case of the high-density optical disk and the common optical disk, degrees of modulation (the ratio of a short period signal size to a long period signal size) are about 0.2–0.5 and close to 1, respectively, which can be used to determine the kinds of the optical disks.

In the step of calculating optimum spot size, the optimum spot size corresponding to the kinds of the optical disks previously stored according to the kinds of the detected optical disk.

In the step of calculating focus offset, defocus amount $Z_O$ is calculated from the calculated optimum spot size by using the above expression (1). As shown in FIG. 5, focus offset amount $V_O$ is calculated by using relation between the defocus amount and the focus error singal.

In the step of adjusting focus offset, the calculated focus offset amount $V_O$ is adjusted and converted to the focus servo signal suitable for focus/track servo.

In the step of compensating focus/track servo, the kinds of optical disks detected by the received the focus/track error signals detected from photodetector 30 and the focus servo signal, actuator 27 is driven which is for adjusting the position of object lens 26 in order to form the optimum optical spot on the recording surface of the disk according to the kinds of the disks.

As described above, by using the controlling method of the light output of the optical pickup device having such steps, of the above-mentioned construction using a short wavelength light source, the optical pickup device has compatibility for use not only with a disk utilizing the short wavelength light source but a conventional disk using a long wavelength light source, and the efficiency of light utilization radiated from the light source can be improved.

It will be appreciated by these skilled in the art that the present invention can be embodied in other specific forms without departing from the scope thereof. The presently disclosed embodiments are therefore considered in all respects to be illustrative and not restrictive. The scope of the invention is indicated by the appended claims rather than the foregoing description.

What is claimed is:

1. An optical pickup device comprising:

a light source;

an object lens for concentrating light generated from said light source onto an optical disk;

a photodetector for detecting signals from the light reflected from the optical disk;

an optical disk detector for detecting the kind of the optical disk from the degrees of modulation of signals detected by said photodetector, wherein different kinds of optical disks are differentiated by the spot size with which the different kinds of optical disks are intended to operate;

a focus offset calculator for calculating a focus offset corresponding to the detected disk kind;

a focus offset adjuster for adjusting the focus offset amount calculated from said focus offset calculator and converting the adjusted focus offset amount to a focus servo signal; and a focus/track servo for compensating for focus and track errors by utilizing the focus servo signal adjusted at said focus offset calculator and the signals detected from said photodetector.

2. An optical pickup device as claimed in claim 1, further comprising a spot size calculator for setting the size of an optical spot corresponding to the disk type detected in said optical disk detector disposed between said optical disk detector and focus offset calculator.

3. An optical pick up device as claimed in claim 1, wherein said light source is a short wavelength light source.

4. A method of controlling a light output in an optical pickup device including a light source, an object lens for concentrating the light generated from the light source onto an optical disk, a photodetector for detecting signals from the light reflected from the optical disk, said controlling method comprising the steps of:

detecting the kind of the optical disk from the degrees of modulation of signals detected by said photodetector, the different kinds of optical disks being differentiated by the spot size with which the different optical disk kinds are intended to operate;

calculating an optimum spot size for setting an optical spot size corresponding to the detected disk kind;

calculating a focus offset corresponding to the detected disk kind;

adjusting the calculated focus offset amount and converting the adjusted focus offset amount to a focus servo signal; and compensating for focus and track errors by utilizing the adjusted focus servo signals and the signals detected from said photodetector.

5. A controlling method of a light output in an optical pickup device as claimed in claim 4, further comprising a step of calculating an optimum spot size for setting a size of an optical spot corresponding to the kinds of the optical disk detected prior to said offset calculating step.

6. An optical pickup device comprising:

a light source;

an object lens for concentrating light generated from said light source onto an optical recording media;

a photodetector for detecting signals from the light reflected from the optical recording media;

an optical recording media detector for detecting the kind of the optical recording media from the degrees of modulation of signals detected by said photodetector, wherein different kinds of optical recording media are differentiated by the spot size with which the different kinds of optical media are intended to operate;

a focus offset calculator for calculating a focus offset corresponding to the detected recording media kind;

a focus offset adjuster for adjusting the focus offset amount calculated from said focus offset calculator and converting the adjusted focus offset amount to a focus servo signal; and a focus/track servo for compensating for focus and track errors by utilizing the focus servo signal adjusted at said focus offset calculator and the signals detected from said photodetector.

7. An optical pickup device as claimed in claim 6, further comprising a spot size calculator for setting the size of an optical spot corresponding to the recording media type detected in said optical recording media detector disposed between said optical recording media detector and focus offset calculator.

8. A method of controlling a light output in an optical pickup device including a light source, an object lens for concentrating the light generated from the light source onto an optical recording media, a photodetector for detecting signals from the light reflected from the optical recording media, said controlling method comprising the steps of:

detecting the kind of the optical recording media from the degrees of modulation of signals detected by said photodetector, the different kinds of optical recording medias being differentiated by the spot size with which the different optical recording media kinds are intended operate;

calculating an optimum spot size for setting an optical spot size corresponding to the detected recording media kind;

calculating a focus offset corresponding to the detected recording media kind;

adjusting the calculated focus offset amount and converting the adjusted focus offset amount to a focus servo signal; and compensating for focus and track errors by utilizing the adjusted focus servo signals and the signals detected from said photodetector.

9. A controlling method of a light output in an optical pickup device as claimed in claim 8, further comprising a step of calculating an optimum spot size for setting a size of an optical spot corresponding to the kinds of the optical recording media detected prior to said offset calculating step.

* * * * *